United States Patent
Gode

[19]

[11] Patent Number: 6,065,223
[45] Date of Patent: May 23, 2000

[54] DEVICE UTILIZING SOLAR ENERGY, ESPECIALLY FOR DRYING AND ROASTING OF AGRICULTURAL-, AS WELL AS FOOD PROCESSING PRODUCTS, FINALIZING DISTILLATION AND EVAPORATION, SEPARATING OF COMPLICATED COMPOUNDS

[76] Inventor: Gabor Gode, Boszomenyi u. 3/a, H-1126 Budapest, Hungary

[21] Appl. No.: 08/600,984

[22] PCT Filed: Aug. 23, 1993

[86] PCT No.: PCT/HU93/00046

§ 371 Date: Feb. 23, 1996

§ 102(e) Date: Feb. 23, 1996

[87] PCT Pub. No.: WO95/05754

PCT Pub. Date: Mar. 2, 1995

[51] Int. Cl.[7] .................................................. F26B 17/12
[52] U.S. Cl. .................. 34/168; 34/93; 126/629
[58] Field of Search ................... 34/60, 61, 166, 34/168, 169, 170, 275, 201, 93; 56/12.2, 16.6; 126/629, 663

[56] References Cited

U.S. PATENT DOCUMENTS

3,775,863  12/1973  Updegrove ........................... 34/166
4,169,459  10/1979  Ehrlich .................................. 126/432
4,391,046  7/1983   Pietraschke ......................... 34/93

Primary Examiner—Henry Bennett
Assistant Examiner—Pamela A. Wilson
Attorney, Agent, or Firm—Young & Thompson

[57] ABSTRACT

A device utilizing solar energy, including four supporting-moving mechanisms moving and adjusting collectors in more than one direction connected to a frame, the supporting-moving mechanism is also connected to a fix base surface, an absorbing plate black colored and with pyramidal or wedge shape is placed on an insulating plate laying on the base plate of the plane collectors placed on the frame, translucent covering plate covers all the surface, baffles between the base plate and translucent covering plate perpendicular to the base plate and parallel to each others provide an air current path, the farthest baffles form side walls, opposite to the inlet of the air current path installed with filter an outlet is provided, the inlet of the air pump house is connected to the outlet to which a device utilizing the heat energy is connected.

16 Claims, 12 Drawing Sheets

DEVICE UTILIZING SOLAR ENERGY, ESPECIALLY FOR DRYING AND ROASTING OF AGRICULTURAL-, AS WELL AS FOOD PROCESSING PRODUCTS, FINALIZING DISTILLATION AND EVAPORATION, SEPARATING OF COMPLICATED COMPOUNDS

BACKGROUND OF THE INVENTION

The subject of the invention is a device utilizing solar energy, especially for drying and roasting of agricultural-, as well as food processing products, finalizing distillation and evaporation, separating of complicated compounds.

DESCRIPTION OF THE RELATED ART

Utilization of solar energy is a most favorable method of generating energy from the point of view of environmental protection. Opportunities hidden in solar energy had been recognized in ancient times, but its utilization on appropriate levels with proper efficiency especially as industrial utilization has only recently been realized. An explanation for this is that the density of the sun's radiating energy is relatively low and it is scattered and depends heavily on the geographical location, season of the year, period of the day and angle of incidence.

Heated water in plane plate collectors constructed as fix, plane receiving screens is generated by direct solar radiation. The heated water gives up its heat energy in a heat exchanger to freon. Freon gas on over pressure expands in a tubo generator to produce electric power. Such a Rankine circulation is provided where the source of heat is the water heated to a temperature of 60–90 degree Celsius. Top efficiency of this type of systems is between 5–11%. These plane collectors despite of their low level of thermal dynamical efficiency are suitable for providing electrical energy for agricultural centers and small scale enterprises.

Devices concentrating solar energy can obtain high temperature with optical concentration of solar energy. Concentration can be achieved by moving the gathering collectors to follow the sun. Suitable devices for concentration are the paraboloid, cylindrical-paraboloid collectors, the spherical mirrors and Presnel type lenses.

Processes and devices mentioned above utilize solar energy in an indirect way.

Cylindrical paraboloid or trough paraboloid collectors belong to the gathering collectors and their rotation is limited. The working liquid located in the focal point vaporizes as it departures from the collector, in the energy transformation system its energy is transformed and the vapor is condensed in the condensator and the liquid streams back under pressure to the pipe line system located in the focal point of the collector.

Implementation of these types of devices requires expensive and very technically sophisticated facilitates.

SUMMARY OF THE INVENTION

An object of the invention is to create a device which significantly decreases the disadvantages mentioned previously and which implements the solar following of plane collectors which are substantially planar and cylindrical paraboloid collectors in two directions and economically utilizes the heat energy in the heat absorbing system of the collectors.

Another object of the invention is a collector capable of absorbing not only direct but scattered radiation of light energy. With two directional movement thereby extending the functioning period for energy collecting. Advantageously, the invention extends the thermal peak performance period and decreases the investment cost per manufactured product unit. Extension of the gathering surface is adjustable according to need with binding elements expediently constructed and matching to the inlets of the plane collectors.

According to the invention, movement of the cylindrical paraboloid collectors further with direct utilization of the heat energy significantly increases the solar energy utilization.

According to the invention following movement is provided to both plane collectors and cylindrical paraboloid collectors in order to achieve a peak gathering period.

According to the invention there following movement is provided by a supporting-moving device fixed on the back side of the collectors' base plate. Further, absorbing black colored plates placed under the translucent covering plate on the insulating plate on plane collectors' base plate preferably having pyramid or wedge shape are applied for good heat absorption and surface extension. A flowing air path is made more effective with baffles after the inlet furnished with an air filter, which air is transported by an air pump to the device utilizing the heat energy, in one case to a product drying device.

A further object of the invention is to provide cylindrical paraboloid collectors wherein food product is conveyed into an absorbing working tube with perforated wall and colored black or gray and located in the focal point of the collectors by utilizing a spiral shaft. Additional working tubes may be connected to each other with arch pipes, so that hot air flowing in a cave constructed in the axle line of the spiral shaft of each absorbing working tube together with the heat energy radiated at the focal point mutually effect and make more efficient processing the product moved in the absorbing working tube.

According to the invention the food product is placed in a product feeding container connected with a sloping, preferably flexible connection pipe to an absorbing working tube which end is connected via an outlet pipe to a gathering container.

BRIEF DESCRIPTION OF THE DRAWINGS

A brief description of the drawings follows:

FIG. 2f shows a part of the device of FIG. 2a.

FIG. 8b illustrates the movement mechanism of the FIGS. 8 and 8a embodiments in section view.

FIG. 8c and FIG. 8d illustrate the spiral shaft of the embodiment shown in FIG. 8.

FIG. 8e illustrate the air inlet pipe of the embodiment shown in FIG. 8.

FIG. 8f illustrates arcing pipe relating to FIGS. 8 and 8a.

FIG. 8h and FIG. 8i illustrate the frame for the absorbing working tube of FIGS. 8 and 8a.

FIG. 8j illustrates the supporting mechanism of the cylindrical paraboloid collector of FIGS. 8 and 8a.

FIG. 8k FIG. 8l and FIG. 8m illustrate the coupling parts of the rotating mechanism.

FIG. 8n and FIG. 8o illustrate the pipe coupling element of the embodiments of FIGS. 8 and 8a.

DESCRIPTION OF THE PREFERRED EMBODIMENT

Figure 1:
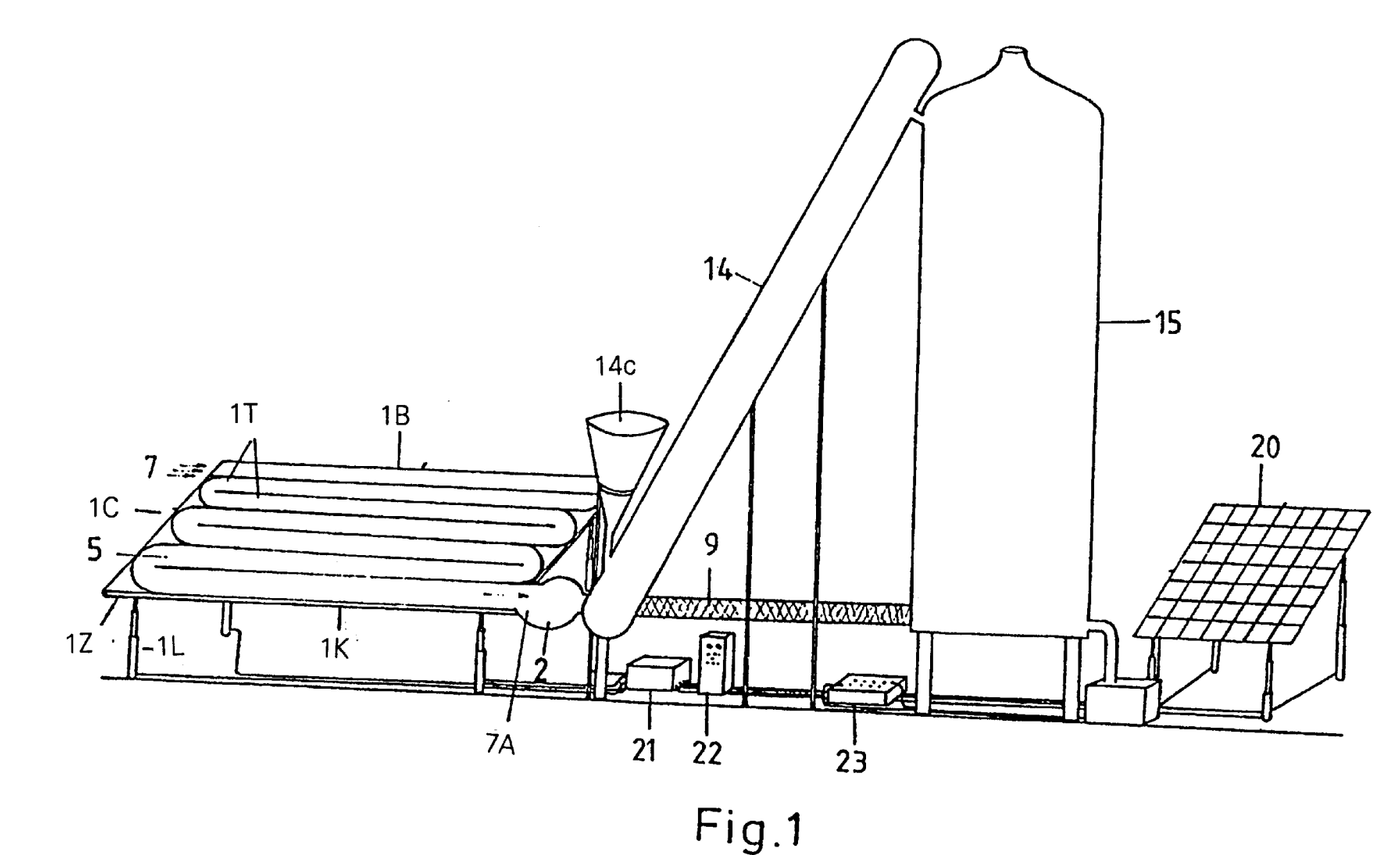
FIG. 1 illustrates a device according to the invention in general outlined structure.

FIG. 1 illustrates a first embodiment of the invention utilizing solar energy. On the place of deployment, a supporting-moving leg-structure 1L for directional movement is placed and is adjustable or electrically controllable. Its upper part is connected to a frame 1K. On the base plate of plane collector 1C placed on frame 1K an insulating plate lies on which absorbing plate 5 with pyramid or wedge shaped surfaces is among baffles 1T. So that an air current path is made. Baffles 1T are placed perpendicular to the base plate, and translucent covering plate 1B covers the entire surface.

Inlet 7 having an air filter is provided with plane collector 1C which among the baffles 1T via outlet 7A including pipe line 9 and air pump 2 is connected to make an open air current path to the device 15 utilizing the collected heat energy. The air entering via the inlet 7 flows among the baffles 1T and is warmed by sun striking the absorbing plate 5. Via the flexible pipe line 9 connected to the outlet 7A transported by the air pump 2, the warmed air travels to the device 15 directly utilizing the hot air. Further, the plane collectors may be connected together.

An automatic sun following system comprises accumulator plantations 23 and control center 22 connected to sun plantation unit 20. Hydraulic control center 21 is connected with pipe lines to the leg-structure 1L supporting and moving the collectors.

Elevator 14 is coupled to device 15. The elevator's bottom part is furnished with a product holding container 14C serving as a feeder.

Figure 2:
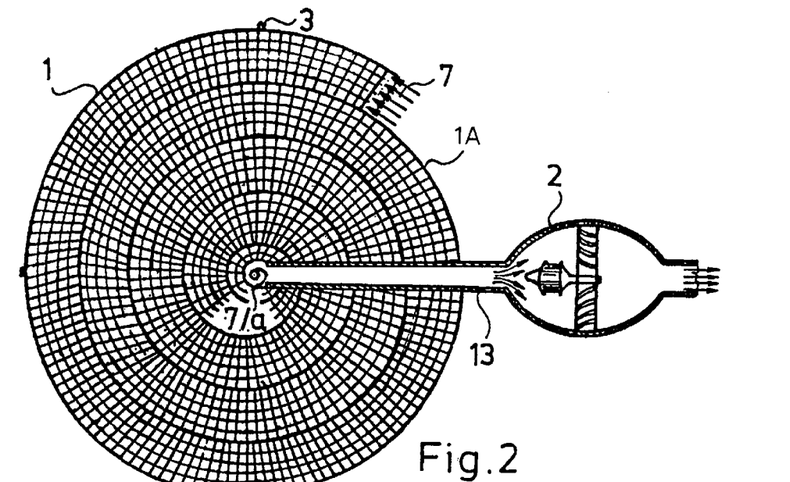
FIG. 2 provides a top and section view.
Figure 2A:
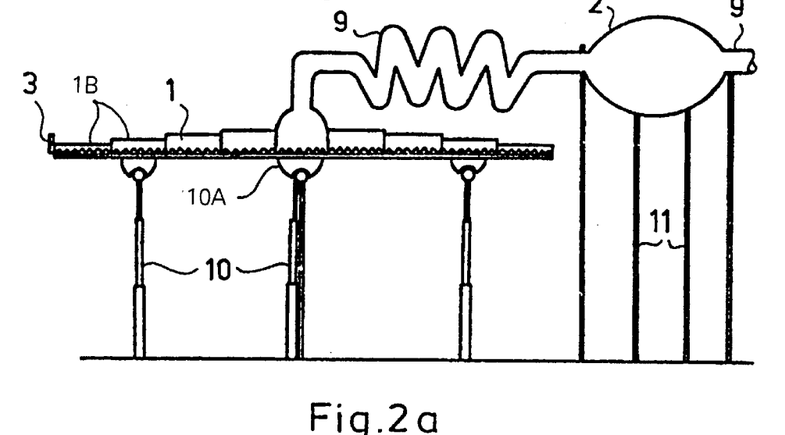
FIG. 2a provides a side view.
Figure 2B:
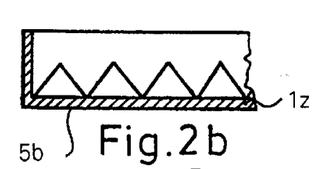
FIGS. 2b and 2c illustrate an absorbing plate in side-view.
Figure 2C:
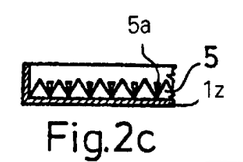
Figure 2D:
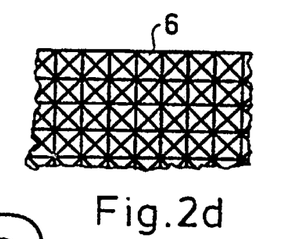
FIGS. 2d and 2e illustrate an absorbing plate in top-view.
Figure 2E:
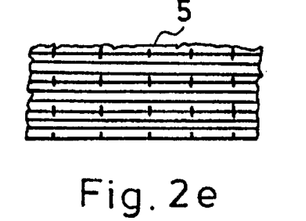
Figure 2F:
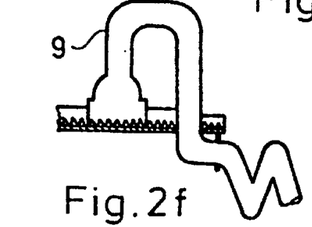

FIG. 2. and FIG. 2e illustrate the base plate of plane collector 1 made in approximately circle form on which baffles 1A are fixed vertically going along spiral line and distributing the base plate for equal fields. The most inside/outside arks of baffles 1A are made as side walls maintaining outside closing of the collectors to the side direction. To reduce the convection radiation loss insulation plate 1Z of appropriate thickness is mounted on the base plate. Inlet 7 is located at the farthest point of the spiral line from outlet 7A. Outlet 7A is connected to flexible air conducting pipe 9 or rigid air conducting pipe 13 at the approximately most inward point of the spiral line. Air conducting pipe 13 as well as 9 are connected directly to an air pump 2 being able to function on plural stages. Rigid air conducting pipe 13 for supplying hot air to the air pump 2 and flexible air conducting pipe 9 should be implemented as appropriate.

An absorbing plate 6 convex pyramid shaped on insulating plate 1C fixed on the base plate is located on the surface flanked by the baffles 1A going along spiral line which absorbs the heat energy of the incident and scattered solar radiation and transfers the heat energy to the air flanked from the upside direction by covering plate 1B. Side walls as well as covering plate 1B, covering the total surface of the plane collector 1, fixed on the vertical edges of the baffles 1A in an air tight way assures the reflection of heat beams and a green house effect.

In another embodiment, absorbing plate 5 colored black and going parallel with bafflers 1A is shaped to a triangular cross section with an acute angle and a wedge shape. Endeavoring to achieve better efficiency in the wedge-shaped gap located at the base of the triangle with acute angled additional baffles 5A running parallel to a height of two-thirds the slope sides of the triangle, on which wedge-shaped baffles in vertical position are distributed assuring turbulent air flow.

In on alternative for moving in two directions and for following the sun the plane collector 1 supporting moving legs 10 are employed constructed telescopically and moved by an hydraulic system, which legs function as hydraulic working cylinders. The upper end of the supporting moving legs 10A is formed as a spherical joint and is connected to the collector's down side surface base plate. Different parts of the hydraulic move system, e.g., the pump, electrical motor, valves control equipment, are placed in hydraulic center 21. Holding legs secure the pump housing 11, made of insulating material walls and containing the air pump 2.

Figure 3:
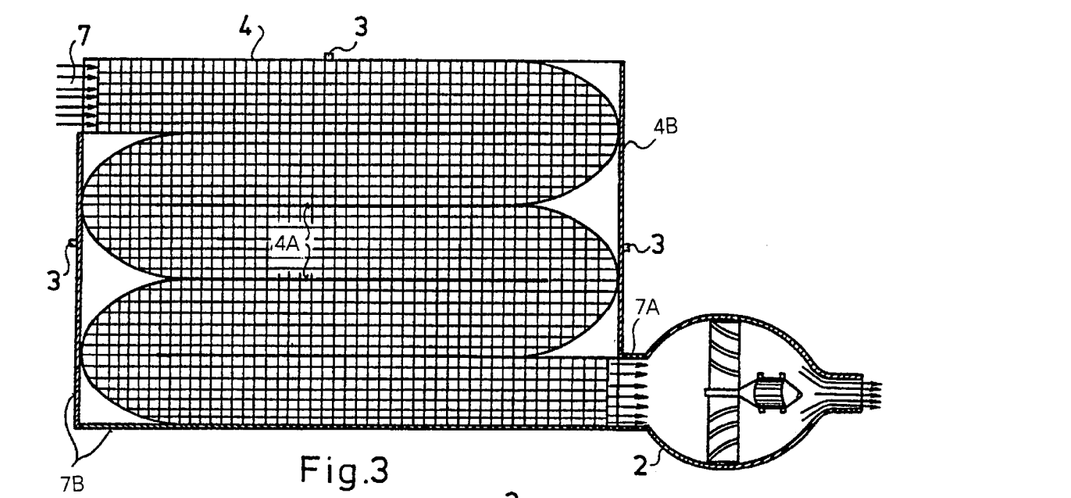
FIG. 3 is a sectional view.
Figure 3A:
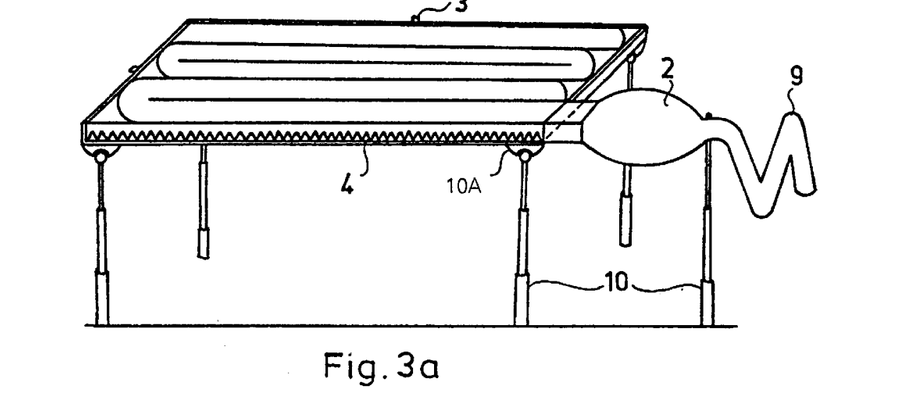
FIG. 3a provides an axonometric view of FIG. 3.
Figure 3B:
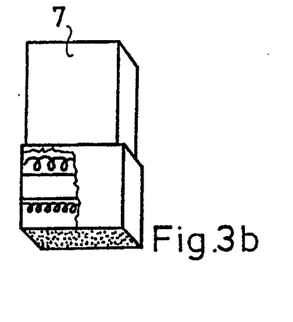
FIG. 3b illustrates an air filter.

With reference to FIG. 3, the structure of plane collector 4 with rectangle shape is similar to plane collector 1. Black absorbing plate 5 or 6 is placed on insulating plate 1Z fixed on the base plate. Baffles 4A are fixed perpendicularly and run parallel with side walls on long side and they ark on the sort side. Side walls 4B of the plane collector 4 are coated with proper thick insulating layer. Outlet 7A is located on an opposite side of inlet 7 mounted with an air filter to which air pump's 2 house is connected directly. Supporting moving legs 10, hydraulical movable, are fixed with spherical joint 10A to the down side surface of the base plate and the equipment for hydraulic movement is located in the hydraulic center 21.

Plane collector 4 according to the invention is an other embodiment, comprising the inlet 7 without an air filter and is fabricated in such a way that with a closely matching connector extension 8 another, or according to need, more plane collector(s) can be connected.

Figure 3C:
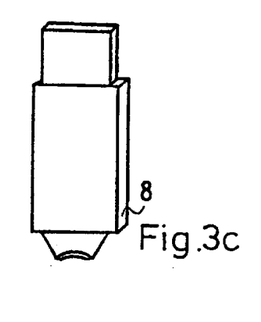
FIG. 3c illustrates a coupling part in the air current path.

Because of the parallel connection of plane collectors 4 flexible air conducting pipe could be coupled between the connector extensions 8 to avoid the shade effect of the collectors.

Figures 4, 4A, 4B, 4C, 4D:
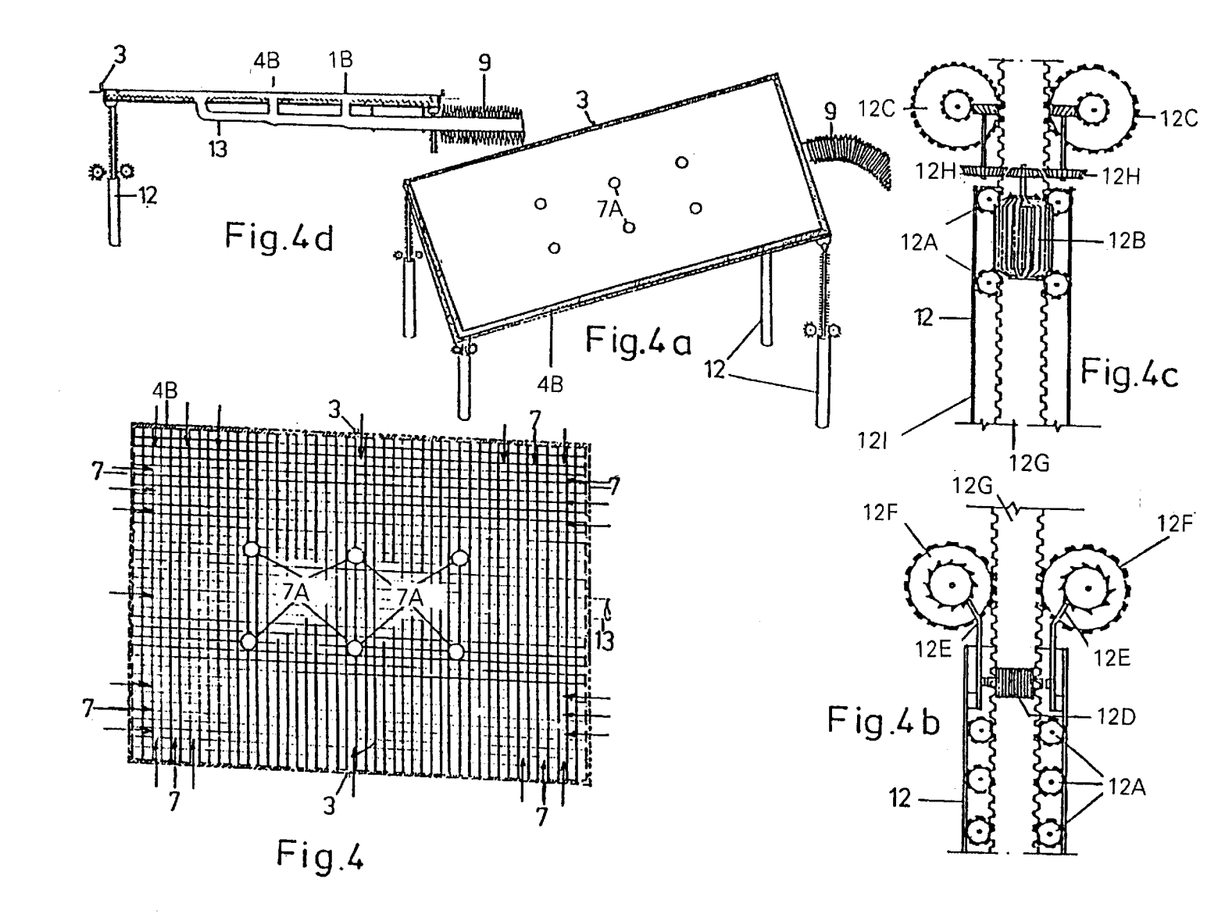
FIG. 4 another embodiment of the invention in top-view.
FIG. 4a illustrates the device according to the invention shown in FIG. 4 in an axonometric view.
FIGS. 4b and 4c illustrate the supporting-moving mechanisms in side-view.
FIG. 4d shows FIG. 4 in side view.

Plane collector 4B shown in the FIGS. 4 and 4d is rectangular and its base plate and insulating plate 1Z and absorbing plate 5 or 6 formed in a similar way as plane collector 4.

Inlets 7 furnished with air filter of plane collector 4 are located on the back side perforated flanking walls of the plane collector 4. Outlets 7A are near to the center of the fastening field and the side walls are constructed in parallel. Flexible air conducting pipe 9 is connected to the hot air-conducting pipes 13 with rigid insulating wall.

Holding moving mechanism 12 moves and supports the plane collector 4. This structure contains the elements as follows: Keeping in direction of cogged screed 12G is made by cogged cam rollers 12A. Electrical motor 12B drives bevel gear 12H to which axle's end with helicoid gears the double cog-wheel 12C is coupled and its outside wheel with larger diameter moves the screed 12G upwards or downwards. Both moving devices are covered by rectangle shaped house 12I in pipe form up to the necessary height. The highest point of the cogged screed 12G is formed as a spherical joint and is connected to the down side surface of the plane collector's base plate.

Figure 5:
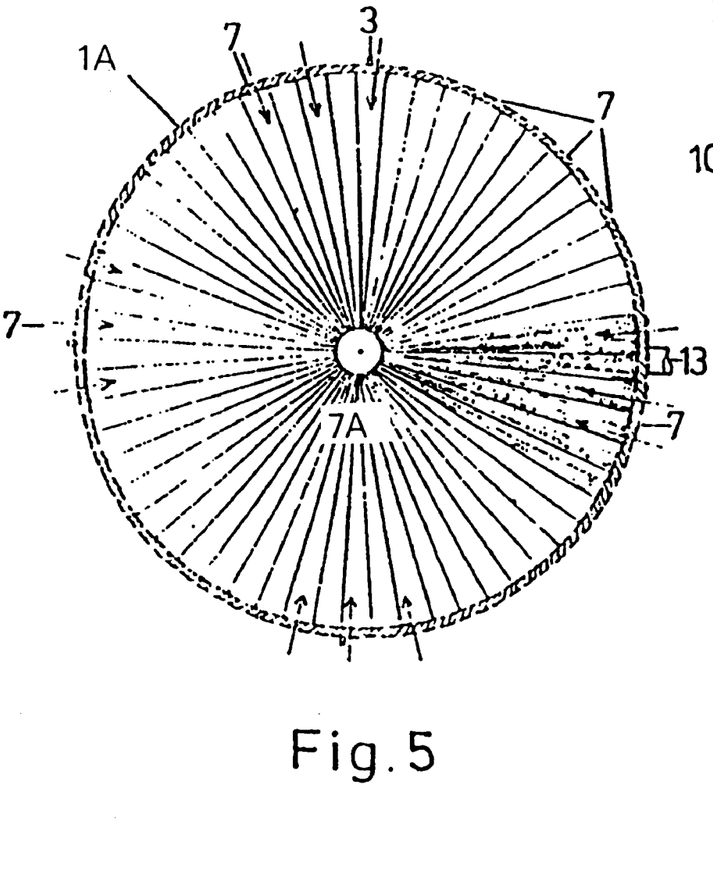
FIG. 5 another embodiment in top-view.
Figure 5A:
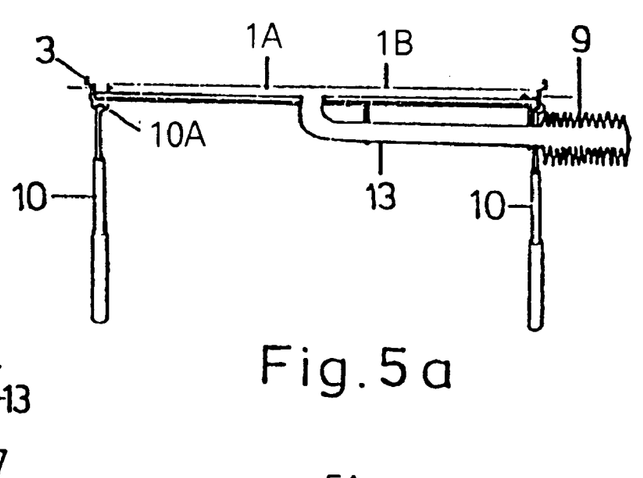
FIG. 5a shows FIG. 4 side-view.

FIG. 5 introduces a plane collector 1A without baffles. Plane collector 1A comprises a proper circuit shape with an outside perimetric wall containing perforated inlets 7 furnished with air filters. There is a circuit shape outlet 7A in the center of plane collector 1A which is conducted through the absorbing plate 5A, the insulating plate 1Z and the base plate in a vertical direction downwards so that the hot air is conducted into the insulated and rigid wall air-conducting pipe 13 to which the flexible air-conducting pipe 9 is coupled.

Figure 5B:
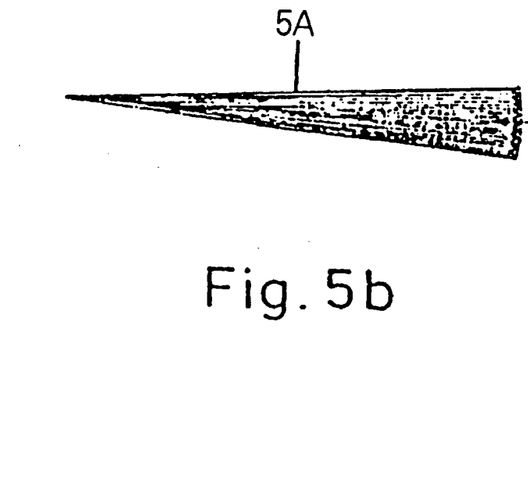
FIG. 5b illustrate an absorbing plate of the invention in top-view.

The sun following movement of the plane collector 1A is created by the holding and moving leg 10 prepared as spherical joint 10A type via the hydraulic system. Absorbing plate 5a is made in the shape of a triangle with an acute angle (wedge-shaped) which cross section is changing as moving in the collector field to the center direction so that the base of the triangle is getting shorter and angles belonging to the base converge to a right angle.

Control of the collectors is made by computer base controlling center 22 (see FIG. 1.) which is connected via cable to photodiodes 3, air pump 2, holding move leg 10 or holding move mechanism 12, hydraulic center 21, battery unit 23, solar cell unit 20 charging the battery unit 23 and electrical motors 12B.

Figure 3D:
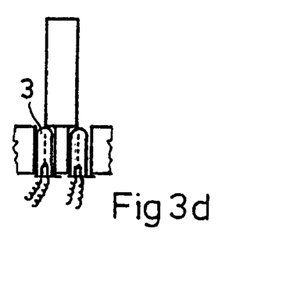
FIG. 3d illustrates light diodes.

Collectors are desirably furnished with photodiodes 3 on the collectors' side wall. A heat energy utilizing device and heat accumulating device can be connected via a valve to the air path of any one of plane collectors' 1, 1A, 4 and 4A, via flexible air conducting pipe 9 connected to the air pump 2. The heat accumulating device is formed with a container with insulating walls containing an air labyrinth made of refractory bricks or with an insulating wall furnished with a closed inlet and outlet, in which one or more air paths are formed as coils along a helical line, where the space between the container's wall and the coils is filled with powder having good heat absorbing and heat transferring ability. The heat accumulating device can be switched on and off with the valve furnished in the hot air system according to the need.

Figures 6, 6A, 6B, 6C:
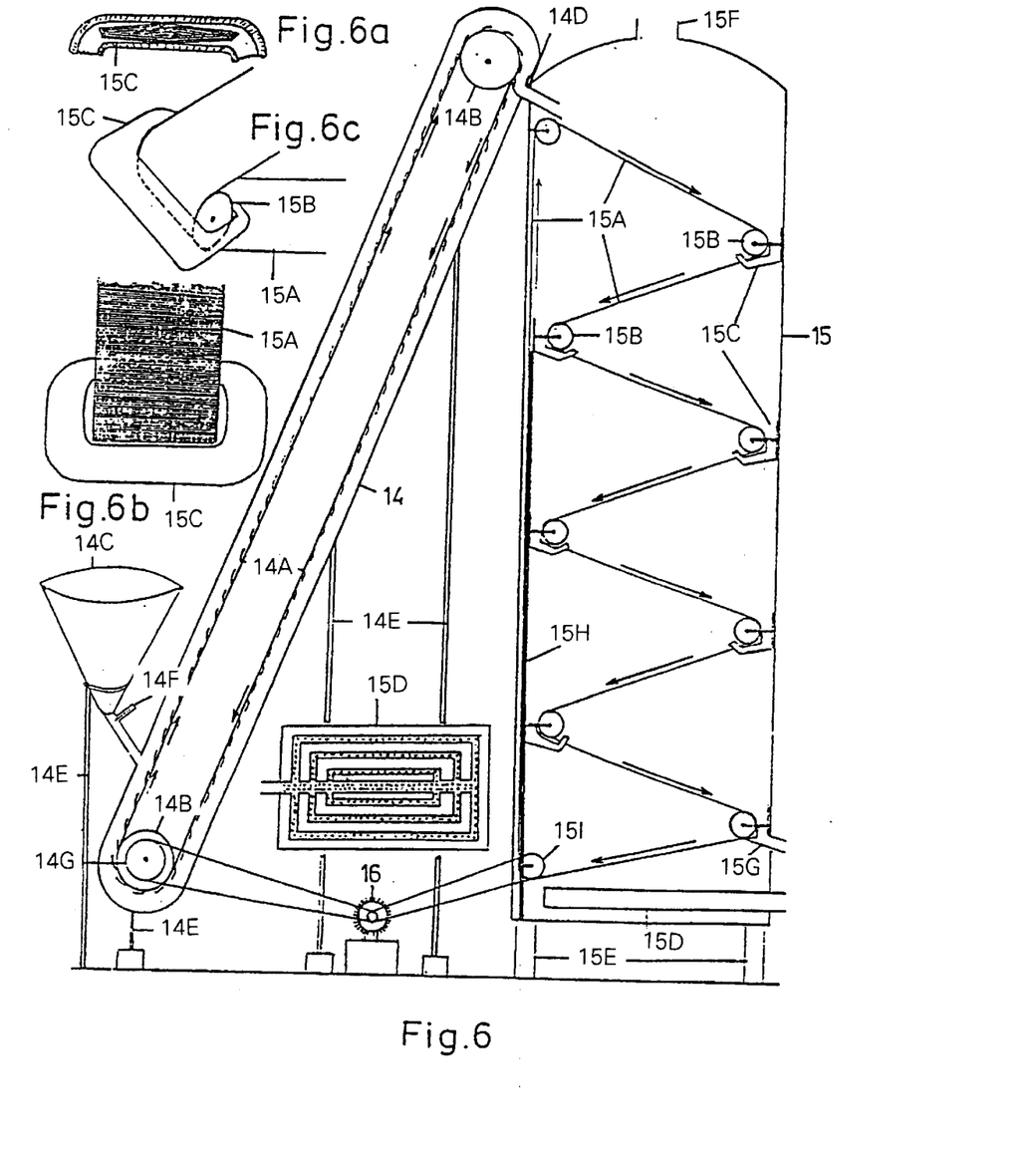
FIG. 6 illustrates a further embodiment.
FIG. 6a and FIG. 6b illustrate the FIG. 6 driving over container in section and top view.
FIG. 6c illustrates the FIG. 6 driving part's axonometric view.

FIG. 6 illustrates a heat utilizing device using heat produced by any of the plane collectors 1, 1A, 4 and 4A. The structure and elements of the drying container 15 with rectangular cross section stand in vertical position include: The drying container 15 coat is made of expedient steel sheet with proper thickness painted gray or black on the outside surface and furnished with stiffeners, on which on the upper side there are both the product feeding pipe 14D and air outlet pipe 15F. On its bottom side there are both the product emptying pipe 15G and in appropriate height above the bottom plate and parallel to it on side heat air distributing pipe system 15D with perforated wall.

Inside the drying container 15 there is an endless drying conveyer 15A constructed sifter-like and moving slantwise downwards and spanned with bearings mounted with rollers with cylindrical shape 15B fixed to the side wall or consoles 15H. At the edge of the conveyor a rim with proper height and cut vertically in appropriate number according to the need. Dropping restoring container 15C is fixed to the wall of the cylinder located between the wall of the cylinder and rollers with cylindrical shape 15B.

Drying cylinder 15 is secured by holding legs 15E.

On both longer parallel sides of the drying container there are hot air injecting pipes at proper heights directed inside with injectors and running around which are connected with one or more pipes to the hot air conducting pipe on the bottom of the drying container 15.

The drying conveyor's 15A movent is provided by the outside conveyor moving disk 15I which is placed on a joint shaft of conveyor moving cylinder roller 15B inside of the drying container 15.

Elevator 14 is applied for supplying the food product into the drying container 15. There is an endless conveyor belt 14A constructed with scoops stretched by cylinders 14B functioning as rollers in the tube with rectangle cross section. Container 14C provides the loading with product prior to processing for the elevator 14 which container is coupled to the elevator device via a pipe line on which wall the product goes through and arrives on the conveyor belt 14A. The elevator device and the container 14C are fixed by holding legs 14E. Outside disc 14G fixed on the joint shaft with down side cylinder 14B and the out side conveyor moving disk are driven by electrical motor 16.

Figures 7, 7A, 7B:
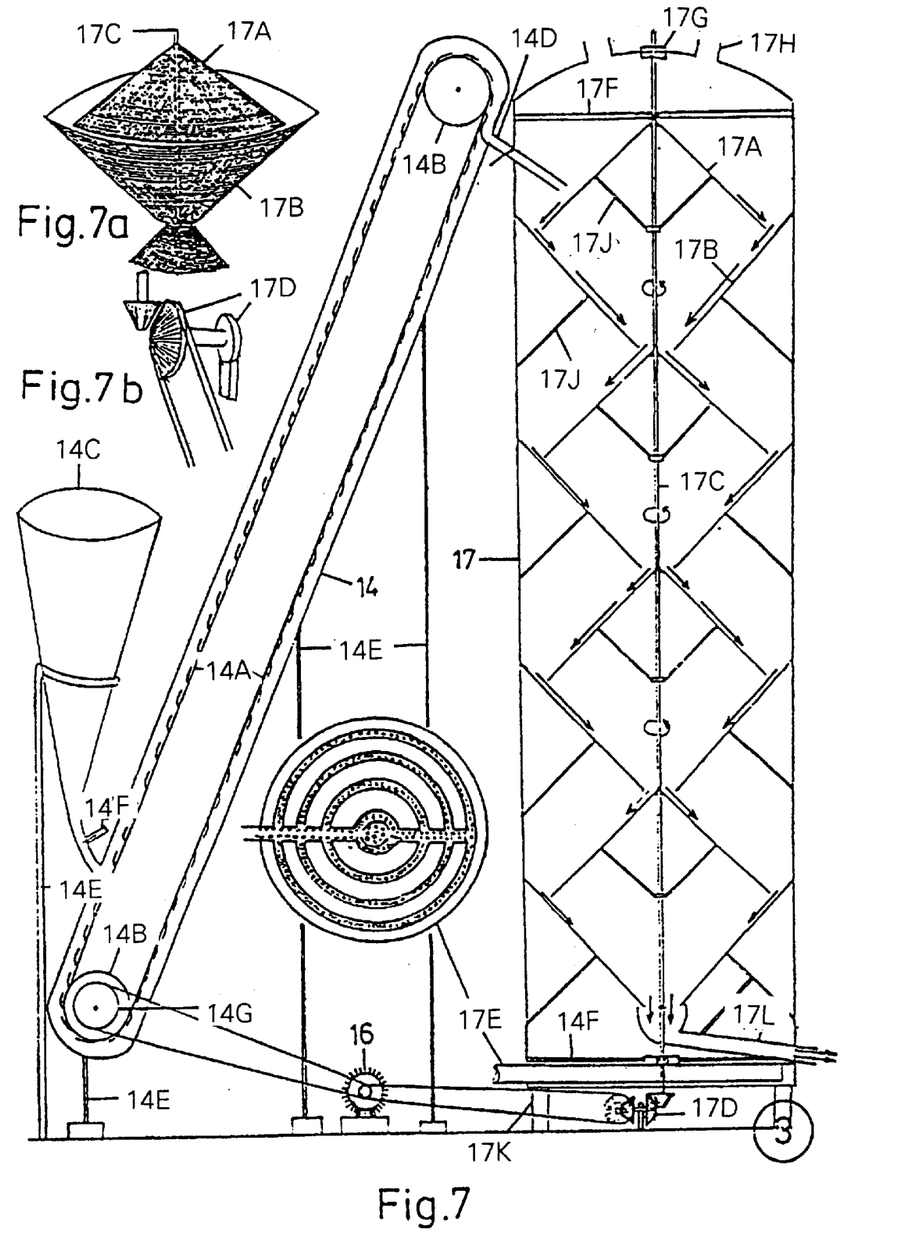
FIG. 7 illustrates another further embodiment.
FIG. 7a illustrates the whirler shown in FIG. 7.
FIG. 7b illustrates the drive of the conical wheel shown in FIG. 7.

FIG. 7 illustrates drying cylinder 17 standing in a vertical position. Into the drying cylinder 17 on its upper side via an opening the food product feeding pipe 14D is coupled and via the covering plate's two or more points the air outlet pipe 17H is coupled. On its bottom side the product emptying pipe 17I and in appropriate height above the bottom plate and parallel, side heat air distributing pipe system 17E with perforated wall are placed. In the center of the drying cylinder 17 there is rotating shaft 17C with upside and down side bearings 17G and fixed with stiffening bars 17F. On the peak point of the rotating shaft 17C and on the center point of its inside wall a whirler 17A with conical shape and made of sifter-like structural material is placed and fixed with supporting bars 17J. On a vertical direction to the side wall of the conical shape whirler 17A directly upside on the inside wall of the drying cylinder 17 and below the whirler 17A, cornet shape fixed whirler 17B is coupled with the supporting bars 17J.

There is a distance between the rotating conical shape whirler's 17a outside contour/edge and the side wall of the cornet shape fixed whirler 17B located nearest to the rotating one, which assures the overcome of the product for drying without restrain. Driving of the rotating shaft 17C is made by electrical motor 16 via driving belt and driving wheel furnished with conical wheel 17D. Air distributing pipe system 17E with perforated wall formed in an expedient way assures homogeneous hot air distribution. On the inside wall of the drying cylinder 17 at a proper height, e.g., from the bottom plate at a two-thirds height, there is a ring form hot air injecting pipe which is connected with conducting pipes going on the wall of the drying cylinder 17 to the hot air conducting pipe. The drying cylinder 17 is fixed by holding legs 17K.

In morning hours, the control unit 22 with computer in control center at the time previously programmed in the cases of the plane collector 1A and 4, turns on the hydraulic center 21 which operates the hydraulic working cylinder of the holding move legs 10 so that those legs located in an Easterly direction are moved upwards vertically and those located in a Westerly direction are moved down in the same time until the collectors are positioned perpendicularly to the direction of the sun. After this the computer evaluates the signal received from the photodiodes 3 and compares it to the stored one in its memory and in the case of deviation it adjusts the direction on the base, using the date measured by the photodiodes. During the day the perpendicular movement to the direction of sun is made by the computer according to the provided program, checking periodically the movement's accuracy and comparing it to the values received from the photodiodes.

All of the holding moving legs' 10 morning starting positions are programmed in the computer separately. The daily program contains the total movement of the working cylinder of holding moving leg 10 in millimeters, depending on time according to the seasons and hours of day, proper to the incident radiation of the sun. A rule of thumb is that following the setting up working cylinders in East direction with the lowest position are moving upwards with different pace and working cylinders in West direction being on highest position in morning are moving downwards with different pace as well.

A length of defined position in millimeters of one working cylinder of the holding moving leg 10 is set for all minutes of the day proper to the season and position of sun. To all minutes of the day belongs a working position set in millimeters to be performed by the working cylinder.

The moving mechanism function for collector 4 follows: The computer starts to operate in the morning according to the calendar on the base program the electrical motor 12B in the East direction capable to function in move stage and the motor starts to move the cogged screed 12G vertically downwards with moving cog wheels 12H and 12C and in the same time the electrical motor 12A in the West direction is operated and it moves upwards vertically the cogged screed with moving the cog wheels.

Accuracy of positioning according to the program is compared with the signal received from the photodiodes 3 by the computer which adjusts the position angle according to need.

Continuous movement during the day of the collectors responsive to the sun's direction in a perpendicular way is made by electrical motor 16 on each holding moving leg separately by periodic operation as decided by the computer program.

According to the morning set up, the control unit with the computer starts to operate the air pump 2 and the air warmed up by the absorbing plate 6 located in the gathering field of the collectors is pumped via the flexible pipe 9 to the working area. Namely, it is conducted into the drying container 15 via the inlet pipe with perforated wall and via the air distributing pipe system 15D and the hot air distributed homogeneously streams upwards vertically in the container.

Subsequently, the control unit with the computer starts to operate the driving electrical motor 16 which drives the outside moving disk 15I and it starts the drying conveyor 15A and in the same time it turns on to rotate the cylinder 14B with the driving of outside wheel 15B on the under driving shaft of cylinder 14B of the elevator 14 which moves upward the conveyor belt 14A. Product supplied previously into the container 14C goes to the shovel containers of the elevator belt 14A because of opening feeder 14F mounted in the connecting pipe and because of the upward movement of the belt and the product through the product feeding pipe 14D spreads on drying belt 15A of the drying cylinder 15. Flexible side walls with proper height and with cut in on the edge of the drying belt 15A prohibits the product from falling down from the drying belt 15a.

The drying belt 15a achieving the roller 15B with cylinder shape pours the product from its surface into the restoring container 15C from where the product comes to the surface of the under drying belt 15A and spreading there, homogeneously it moves downward together with the belt.

This process is repeated until the product goes outside the drying container via the product emptying pipe 15G into an appropriate container as a final product. The product moving down and meeting with hot air loses its moisture content in the necessary amount.

The control unit with the computer switch on the electrical motor 16 with plural operating stages on such a rotation level which is proper for the intensity of the sun radiation and for the moisture content of the product for drying. The level of the drying can be controlled by operating the feeder 14F built in the inlet pipe of the container 14C. This above automatic control can be supplemented with manual adjustment.

Drying cylinder 17 functions as follows. Electrical motor 16 drives the driving disk installed with conical wheel 17D and moves the rotating shaft 17C staying vertically in the center of the drying cylinder 17, and the conical shape whirlers 17A start to rotate. The product for drying brought in via the product feeding pipe 14D from the elevator 14 drops and spreads on the conical shape whirlers 17A and from there the product whirls down on the cornet shape whirler 17B fixed on the inside surface of the drying cylinder where it whirls slowly down on the conical shape whirlers 17A and from them again to the cornet shape whirler 17B and finally via the cornet form gathering device located on the bottom of the cylinder and via the product emptying pipe 17I the final product goes out and it is gathered in a proper receptacle. Hot air goes into the drying container through the hot air pipe then via the air distributing pipe system 17E with perforated wall assuring the homogeneous hot air distribution of hot air streams upwards in the drying cylinder 17 meanwhile drying the product going downwards, then hot air leaves the container on the upper side of the drying cylinder 17 via their outlet pipe 17H.

Figure 8:
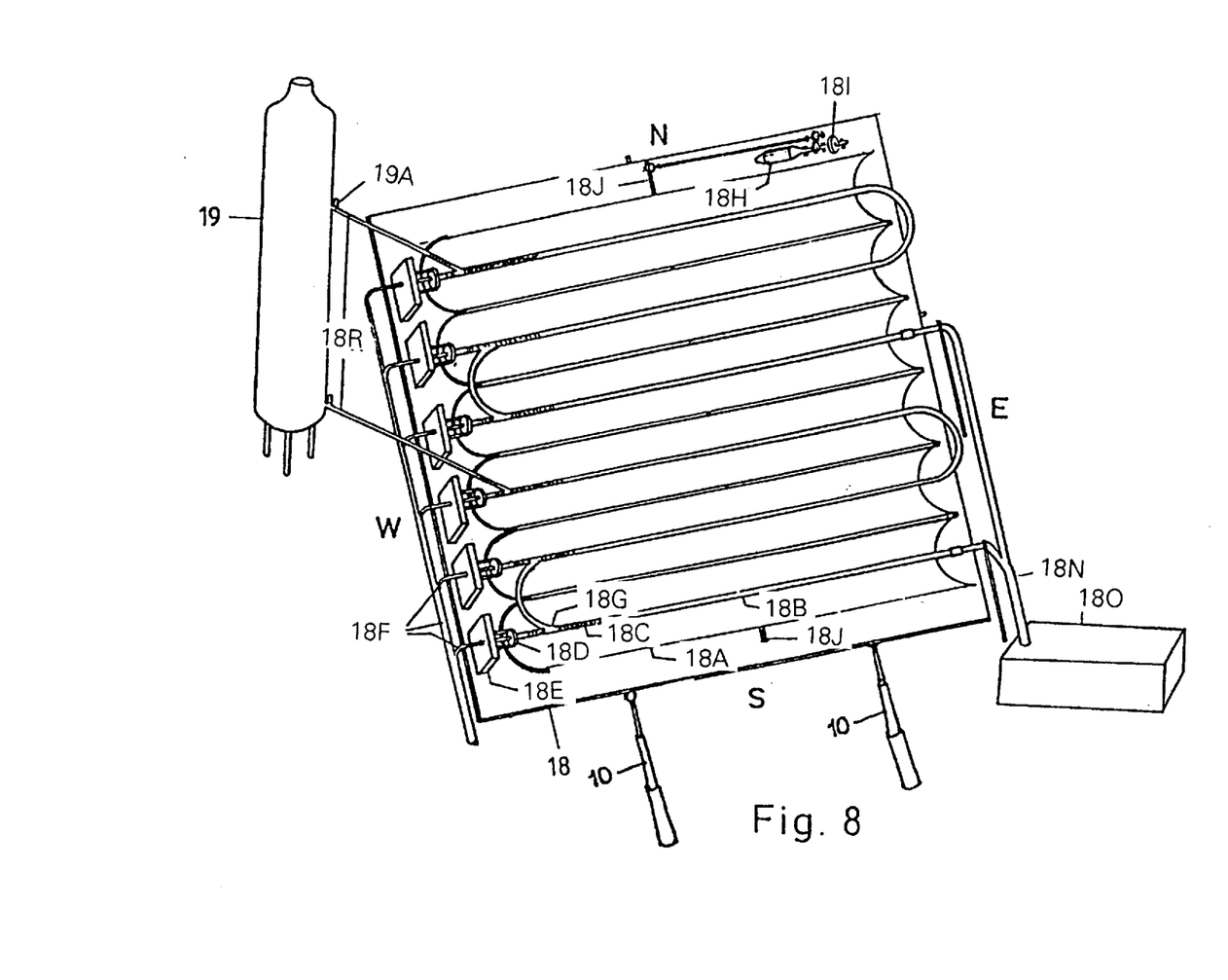
FIG. 8 illustrates an embodiment in an axonometric view.

FIG. 8 illustrates a collector system formed in plantation form constructed with cylinder paraboloid set up side by side to each other on movable holding plate 18.

The collector system contains expediently six or more of cylindrical parabolic collectors 18A connected to each other as functioning and structural elements as well.

Figure 8A:
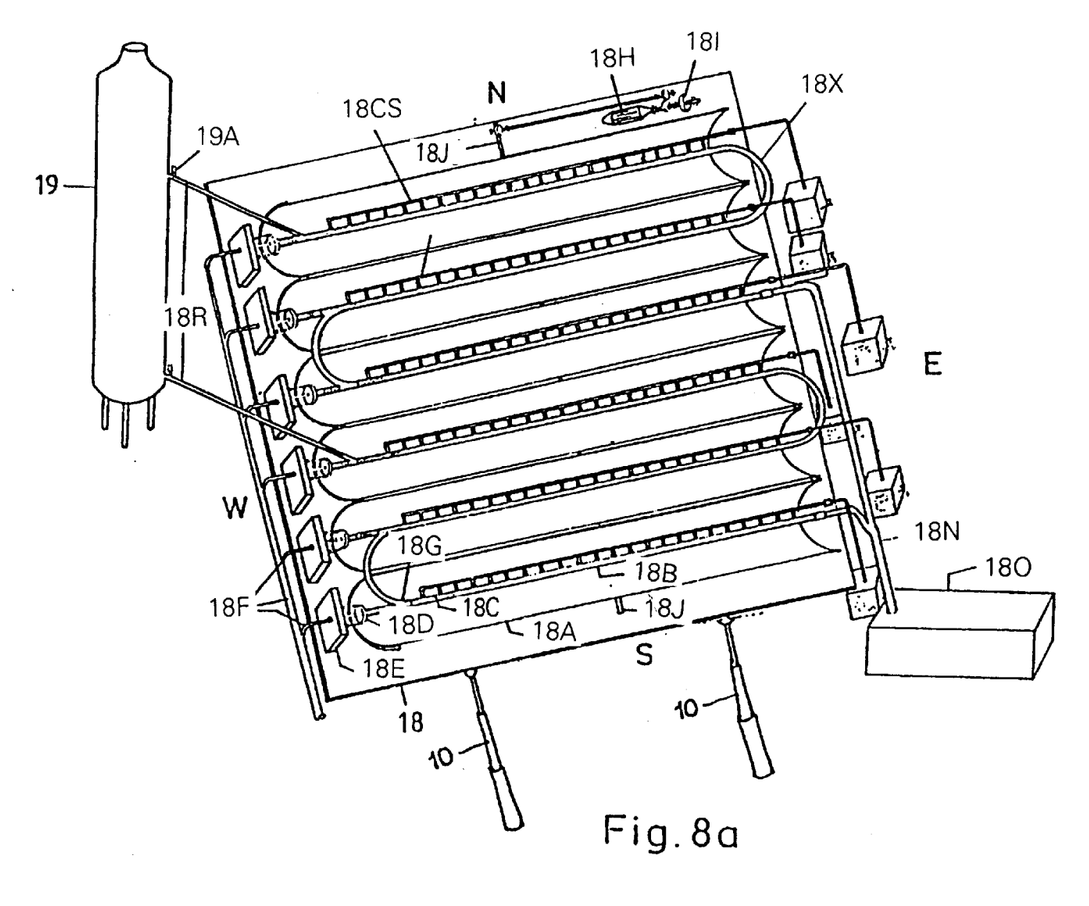
FIG. 8a illustrates still another embodiment.

Cylindrical parabolic collector 18A with a requested length and aperture with high reflexing ability on its inside concave surface, e.g., a high mirroring level, has in its focal point an absorbing working tube 18B with a proper diameter and is colored on its outside surface black or gray with a closed or with entirely or partially perforated wall, which is fixed by holding bars 18P on both ends of the collector's body. The inlet of the absorbing working tube 18B is closed with a disc on through which goes a spiral shaft 18C for transporting the product for drying or processing into the absorbing working tube 18B. The spiral shaft 18C is formed in a pipe-like way and among its spirals on the shaft are small holes/openings starting from the inside cave of the axis made in a quantity according to the need for driving out the hot air streaming in the pipe. A driving shaft of the spiral shaft 18C is fixed in turnable form on the double frame 18D which has bearings. The spiral shaft's 18C driving axis furnished with edge and bearing is placed in the wider part of the bearded double frame 18D so that the end of the pipe like case going along the middle part of the driving axis as well as its inlet is opposite to the outlet of the hot air inlet pipe 18F furnished with an edge on its extended axis line. In this way, the hot air can stream freely out from the end of hot air inlet pipe 18F mounted in a fixed way to the outside of the double frame 18D into with bearing the pipe-like cave in the spiral shaft 18C rotating in bearing.

Figures 8B, 8C, 8D, 8E, 8F:
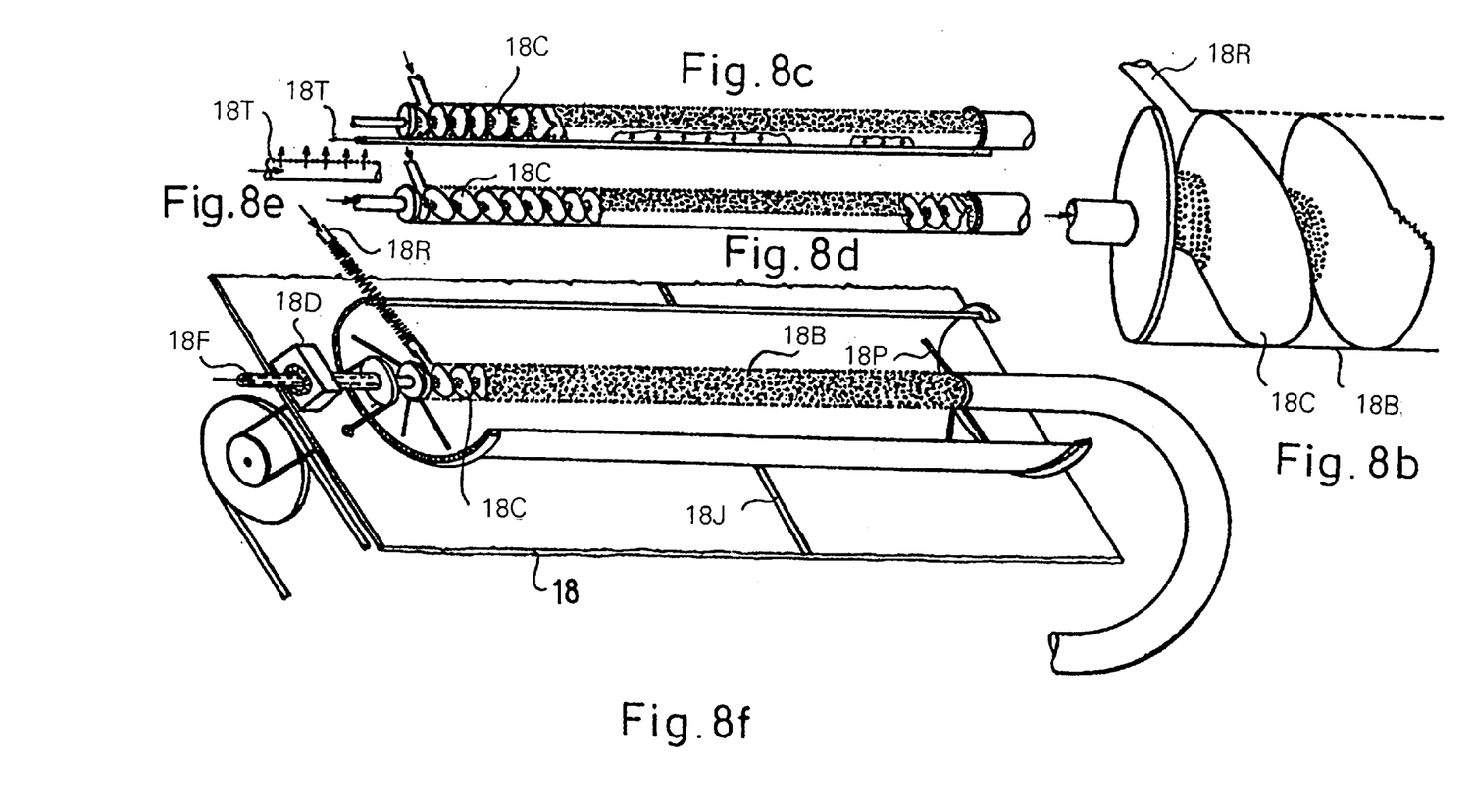

FIGS. 8c and 8d show the spiral shaft 18C manufactured in solid form and under which there is the air inlet pipe 18T perforated upside which is for conducting air into the absorbing working tube 18B. On the upper side of the air inlet pipe holes are made on its wall located in vertical positions along the long direction line. These holes coincide with the holes downwards on the vertical wall of the absorbing working tube 18B. There are insulating rings by the coinciding holes between the two pipes' wall. The surface of the most upper vertical out side wall of the air inlet pipe 18T and the lowest part of the wall of the absorbing working tube 18B are fixed together with permanent binding in such a way that the holes between them coincide and in this way, from the air inlet pipe 18T streaming out via the upper holes streams via the holes on the down side wall of the absorbing working tube 18B into this tube and through the product driven by the spiral shaft, the air leaves the absorbing working tube via the holes on its upper side wall into the open air.

With reference to FIG. 8a, the spiral shaft 18C is manufactured in solid form and above the absorbing working tube 18B parallel with it a properly planed vapor-drained pipe 18CS in cross section goes on which is connected by vertical thin pipes with fix binding to the absorbing working tube 18B with solid wall.

Product for processing is placed in the feeding container 19 while the processed product is collected in the receptacle 18O via the emptying pipes. Coupling pipes 18R start from the feeding container 19 in rigid wall form which continues in flexible pipes to the direction of the absorbing working tube 18B. The collector end of the flexible pipe line is connected to the turnable pipe-stub coming from the left upper side end of the absorbing working tube 18B according to the figure with fix binding. The product feeding and emptying pipes as well as between the neighboring collectors 18A arcing pipes on the beginning of the collectors as well as through arcing pipes 18G on the end of the collectors, the latest being an extension of the absorbing working tubes 18B, are formed covering each other in such a way that in the covered pipe in the center of the covering there is an expediently formed aperture with proper dimension that the product can move from one pipe to the other without restrain.

Figure 8G:
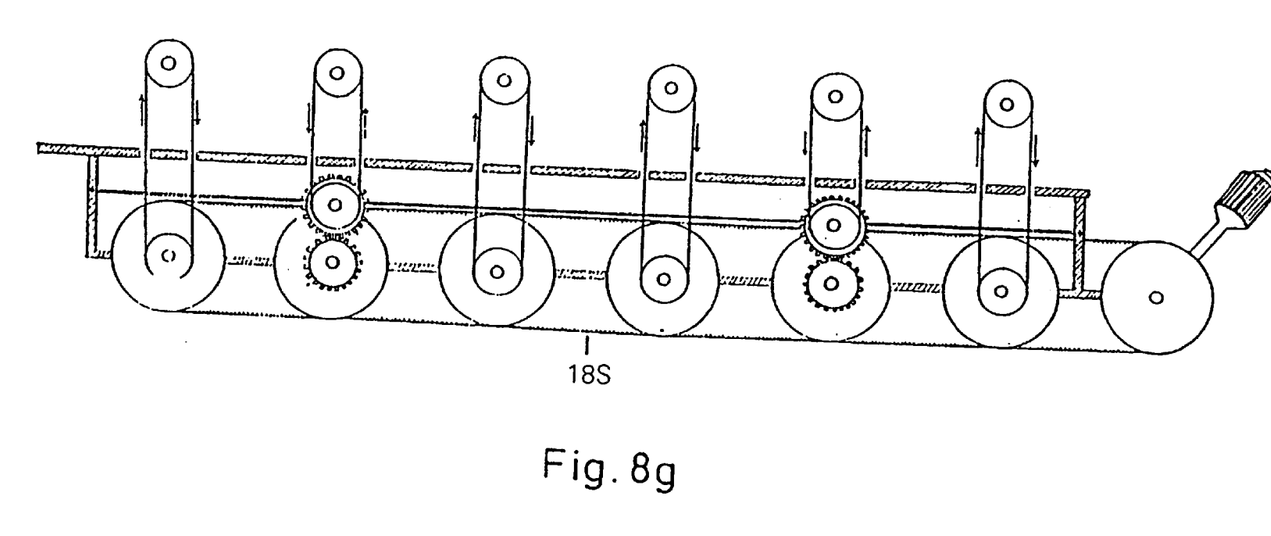
FIG. 8g illustrates the mutual driving part for FIGS. 8a and 8f.
Figure 8H:
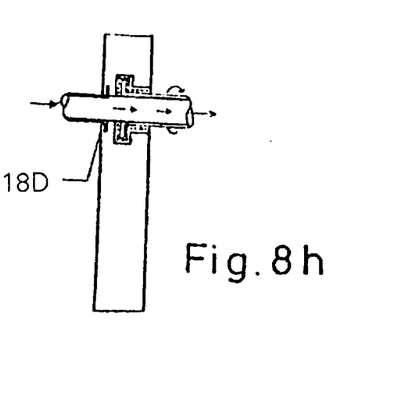
Figure 8I:
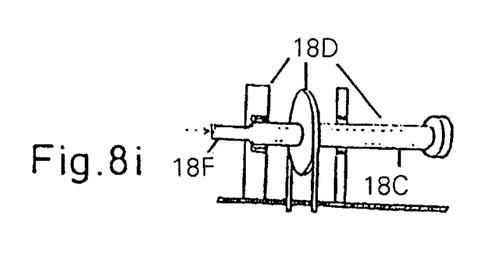

Driving of the spiral shaft 18C is made with the disk fixed on the driving shaft between the beard double frame 18D. This driving disk is connected with driving belt to the driving mechanism 18S containing the driving electrical motor, holding frame, cog-wheels, double disks under the move holding plate 18 supporting and move the collectors.

Disk mounted on the driving shaft is connected with driving belt to the smaller diameter disk of double one with common axle located vertically under the disk on the driving shaft and it drives the shaft in clockwise direction. Exceptions from this are the cases of collector 18A second and fifth from an up to down direction according the figure where the spiral shafts 18C turn opposite clockwise (previous turns were clockwise). This rotation is assured by the disk mounted on common shaft with the cog-wheel driven by cog-wheel mounted on the shaft of the bigger disk belonging to the second and fifth collectors 18A. Driving of the bigger disk is made by a separate electrical motor 18B able to work on more stages with the same diameter disk on its shaft via cogged driving belt.

Collectors' 18A move fixed on movable holding plate 18 can be made as follows. On the shaft of the electrical motor 18H able to work on plural stages, there is a cog-wheel with fixed binding and it is matching with the cog-wheel moved vertically on the vertical axle by two electric magnet coils and it drives the shaft in the desired (given by the control unit) direction. Opposite to the cog-wheel on the shaft of the electrical motor the center of the long shaft is cogged as long as the circumference of the cog-wheel in that way that the center point (cogged in negative direction) of the cog-wheel on the long shaft is matching. The electric magnet coil on left side according to the figure installed on the holding table during its functioning moves on the cogged part of the long shaft the cog-wheel beside the side direction turnable wheel installed on its front and backwards moving shaft than in the case of stopping to function the opposite side (being on the other side of the cog-wheel) wheel moved by electric magnet coil pushes back the cog-wheel in its original position after stopping the electrical motor 18H.

Figures 8J, 8K, 8L, 8M, 8N, 8O, 8P:
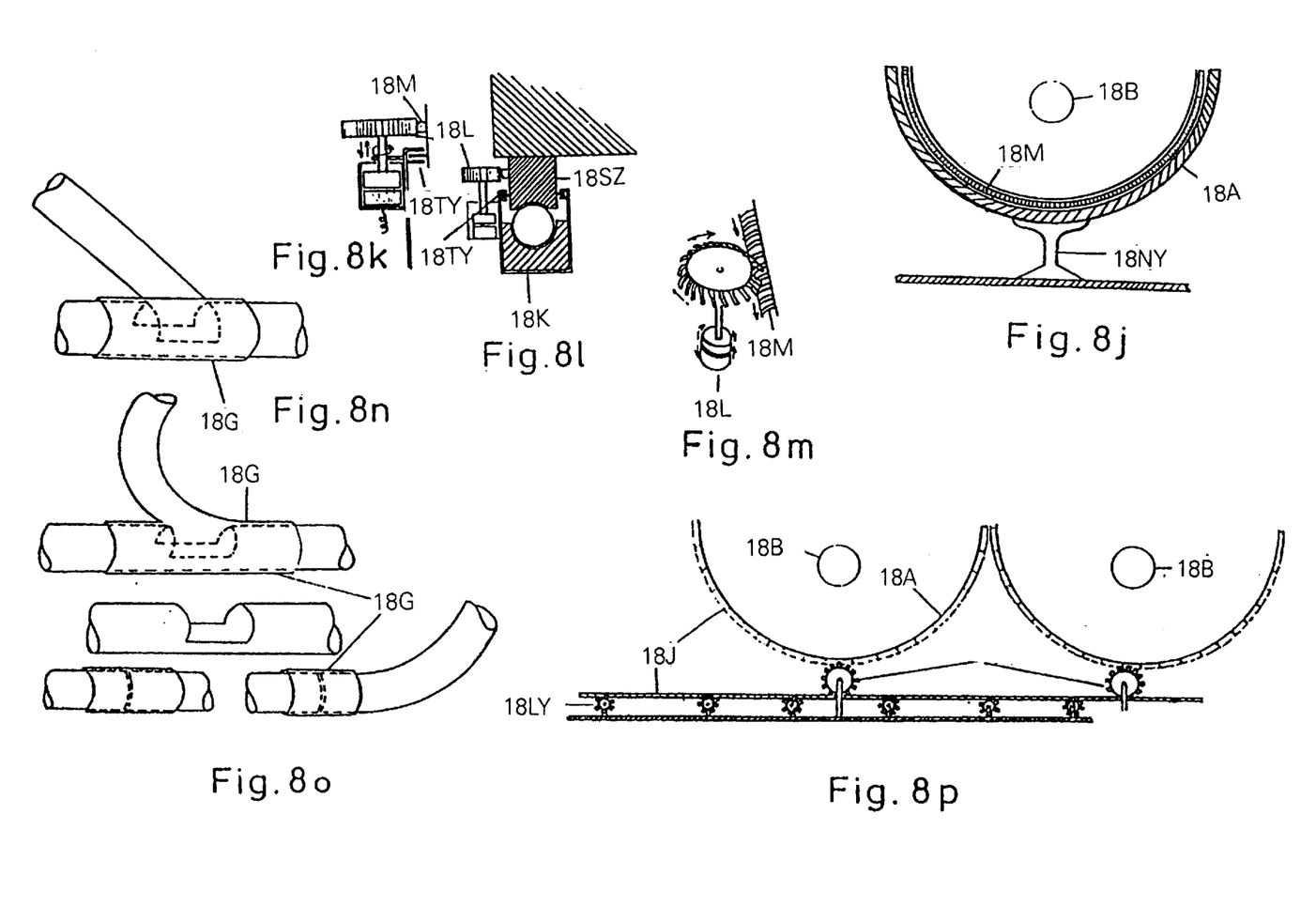

A cog-wheel with proper diameter is fixed in the other end of the halving point of the collector's segment on the other end of the long shaft which moves the cogged screed 18J (or cogged chain) in the right direction and level in front and back direction. The cogged screed 18J goes under the cylindrical parabolic collector 18A located on holding legs via the center line of a proper length of the holding plate's 18 width. Cogged guide rollers 18LY placed in proper density support and keep in direction the rigid cogged screed 18J on the moving mechanism. The shafts of the cogged conducting rollers with bearings on both ends are fixed with a supporting console on the holding move plate 18. Both ends of the cogged screed 18J are furnished with bumpers to avoid the over pulling of the screed. Above the cogged screed 18J there is a cog-wheel with proper diameter connected to the previous one's cogs in the axle line of the cylindrical parabolic collector 18A under its lowest point which cog-wheel is connected to the cogged screed to the outside surface of the cylindrical parabolic collector 18A and the cog of cogged screed 18J.

There is a down side edge 18K and an upper side edge 18SZ constructed and furnished with roll bearings on both the long side end of the body of the cylindrical parabolic collector 18A which edges are extended the total width of collector 18A. Edge 18K is fixed with solid binding to the holding legs fastened on the holding move plate 18 in the vertical axis of the collector. Cogging 18m is formed on outside of the upper side of the upside edge 18SZ on its total length. Cog-wheel 18L, which is moveable with a vertical shaft, is connected to this cogging 18m. The shaft of the cog-wheel 18L is attached to a electro-magnetic pulling disk which is fixed to the outside of the down part of the edge 18K on that way that the pulling disk turns on or off the couple between the cog-wheel 18L and the cogging 18M depending on the controlling position. Upper edge 18SZ extends into the down side edge 18K on vertical direction downwards which upper edge's 18SZ down part is formed bearing lie. Guide bar 18TY is attached to both sides of the upper edge 18SZ which guide bar 18TY is enclosed by the double screed of down side edge 18K from down and from both side directions. There are one—one wedge-shaped buffers on both ends of the guide bar 18TY, which buffers impede over rotation. Total weight of the collector 18A is put on the upper edge 18SZ which puts its via the rollers (balls) embedded into the down side edge 18K which put it further via the holding legs 18NY to the holding plate 18. Movement of the holding plate 18 is made by hydraulically operated holding move legs 10 or holding move mechanism 12 operated by electrical motor 12B having been discussed previously. The control unit 22 with the computer directs, according to its prior fed program, the collectors, the solar cell unit 20, and the holding move plate 18, of the cylindrical parabolic collector to the East into the direction of sun in the morning hours, then it checks the sun's direction and adjusts the collector direction according to any need as indicated by the signals received from the photodiodes 3.

North-South movement of the cylindrical parabolic collector 18A after setting the holding move plate 18 is made with electrical motor 18H as follows. The control unit with operating of the pulling disk mounted on the exterior side of the edge 18K down and with the cog-wheel 18L fixed on the shaft of the pulling disk lifts the cog-wheel 18L out of the cogging 18M furnished on the upper edge 18SZ and on this way it makes free the movement of the body of the collector 18A. After this, the control unit with starting the electrical motor 18H moves the cogged screed 18J with the cog-wheel coupled to it in the requested direction and measure. The cogged screed 18J moving on the cogged guide rollers 18LY rotates the cog-wheel 18GY which moves the cogged screed 18J attached to the external side of the collector and it makes the proper position of the collector in the North-South direction.

Movement of the East-West direction is made by the control unit continuously and periodically stops this operation according to any need and it makes adjustment of North-South direction as well.

Having stopped the adjustment of direction positioning, the control unit turns on the air pump 2 and opens on a requested level the feeding bolt located in the coupling pipe 18R and at the same time, starts to rotate the spiral shaft 18C. The spiral shaft 18C is rotated in such a way that the control unit 22 switches on the electrical motor 18H operating the driving device 18S which drives with the disk mounted on its shaft the other disk with bigger diameter than disk with smaller diameter mounted on common shaft respectively in the case of double cog-wheel the disk mounted on the shaft of the upper co-wheel turns it via the belt driving the disk of the spiral shaft 18C.

The food product moving into the absorbing working tube 18B is warmed by the mirroring surface of the hot air pumped via the spiral shaft. Final product is gathered via the outlet pipe in the receptacle 18O.

Processing level (drying level) of the product is set by the control unit furnished with the computer by selecting the rotation speed of the spiral shaft 18C as well as the opening level of the feeding bolt located in the coupling pipe 18R.

In another embodiment, the wall of absorbing working tube 18B and the spiral shaft 18C are solid and without air injection. Vapor generated in the absorbing working tube 18B is conducted away by a separating pipe going above the absorbing working tube 18B connected to it with small pipes. Vapor generated is condensed in the outlet pipe and it is conducted into a container where it is accumulated. Different vapor outlets per each collector 18A makes it possible to separate complex materials and compound the heat treatment.

I claim:

1. A device utilizing solar energy for drying and roasting of agricultural and food processing products comprising:
    collectors fixed on a frame having a backside, each of said collectors being substantially planar;
    a moving mechanism on the backside of said frame for moving said collectors in both an East-West and a North-South direction to track direction of incoming solar radiation;
    said moving mechanism comprising plural supports for said frame, which supports move independently of each other;
    position monitoring means and moving mechanism control means designed and adapted to be pre-programmed with an established daily tracking path which is adjusted subject to position information from said position monitoring means;
    one end of each of said supports being attached to a fixed base surface;
    each of said collectors comprising
        an absorbing plate with a surface comprising a plurality of one of a pyramidal and wedge shape,
        an insulating plate placed on said frame and supporting said absorbing plate,
        a translucent covering plate covering said absorbing plate,
        baffles extending from said absorbing plate to said covering plate to define air paths within said collector;
        a collector inlet opening at a beginning of the air paths; and
        a collector outlet with a filter opposite said collector inlet opening at an ending of the air paths;
    an air pump housing operatively connected to said collector outlet; and
    a drying device operatively connected to an output of said air pump housing to receive heated air from said collectors.

2. The device of claim 1, wherein one of said collectors further comprises a helical air path.

3. The device of claim 1, wherein one of said collectors further comprises first plural parallel air paths in a first direction adjacent second plural parallel air paths in a second direction, said first and second plural parallel air paths joined by connecting arched air paths.

4. The device of claim 1, wherein one of said collectors further comprises plural collector inlet openings located along plural sides of said collectors and plural collector outlets located in an interior portion of said collectors.

5. The device of claim 1, wherein one of said collectors further comprises a circular shape with plural collector inlets located around a peripheral edge of the circular shape, said plural collector inlets comprising perforated bordering walls of one of said collectors and air filters placed on said perforated bordering walls, and said collector outlet of one of said collectors being located at a center of the circular shape.

6. The device of claim 1, wherein said frame is integral to said collectors.

7. The device of claim 1, wherein said plural supports comprise hydraulically telescoping legs.

8. The device of claim 1, wherein said plural supports comprise co-operating screed moved by cog-wheels.

9. The device of claim 1, wherein said air pump housing comprise a connection means for operatively connecting to said collector outlet and to said product drying device, each of said connection means comprise an insulated rigid wall and a flexible tube.

10. The device of claim 1, further comprising, intermediate said drying device and said collector outlet, a container comprising an outlet terminal for discharging products and an insulating wall containing an air labyrinth designed and adapted as a heat accumulator.

11. The device of claim 10, wherein said labyrinth comprises refractory bricks.

12. The device of claim 10, wherein said product drying device further comprises:

a drying container standing vertically, a feed pipe connecting to an upper end of said vertically standing drying container, an air outlet pipe, operatively connected to said collectors, connected to a bottom location of said drying container for providing heated air to the bottom of said drying container, an endless drying conveyor constructed of plural alternating direction conveyor sections with air-permeable belts moving downward from a upper location of said drying container below said feed pipe and slanting downwards, each of said plural conveyor sections spanning across a width of said drying container and mounted to provide directional change on a side wall of said drying container; and wherein said air outlet pipe controllably provides heated air for passing upwardly through said conveyor section air-permeable belts and the product placed thereupon.

13. The device of claim 10, wherein said drying device further comprises:

a drying container standing vertically, a feed pipe connecting to an upper end of said vertically standing drying container, an air outlet pipe, operatively connected to said collectors, connected to a bottom location of said drying container for providing heated air to the bottom of said drying container, a rotating central axle, located centrally within a horizontal cross-section of said drying container, driving vertically displaced whirlers having a generally conical shape and made of air permeable material, said whirlers displaced vertically and rotated by said central axle to controllably move the products received from said feed pipe vertically downward from said drying container in a series of horizontal downwardly slanted movements, each of which movements change direction with respect to said rotating central axle, wherein said air outlet pipe controllably provides heated air for passing upwardly through said whirlers and the products moving thereupon.

14. A device utilizing solar energy for drying and roasting agricultural products, comprising:

cylindrical paraboloid collectors fixed on a frame, each of said collectors being mounted on a moveable consoling plate and further comprising a plurality of concave mirror surfaces located behind an absorbing working tube, and a plurality of arcing pipes, each of said arcing pipes connecting one said tube to another said tube, a backside of said frame being furnished with a moving mechanism, a spiral shaft for transporting the products for drying within said absorbing working tube, a moving mechanism on the backside of said frame for moving said collectors in both an East-West and a North-South direction to track direction of incoming solar radiation;

said moving mechanism comprising plural supports for said frame, which supports move independently of each other; and position monitoring means and moving mechanism control means designed and adapted to be pre-programmed with an established daily tracking path which is adjusted subject to position information from said position monitoring means.

15. The device of claim 14, wherein said absorbing working tube further comprises an air inlet pipe interior to said spiral shaft, said air inlet pipe being perforated along its length.

16. The device of claim 14, wherein said absorbing working tube further comprises a vapor drain pipe connected to a gathering container.

* * * * *